United States Patent Office 2,713,034
Patented July 12, 1955

2,713,034

TREATMENT OF ALKALINE EARTH METAL PETROLEUM SULFONATES

Edgar W. Clarke, Laurel Springs, N. J., and William Schreiber, Philadelphia, and Paul D. Kneeland, Bala-Cynwyd, Pa., assignors to The Atlantic Refining Company, Philadelphia, Pa., a corporation of Pennsylvania No Drawing. Application July 1, 1954,
Serial No. 440,853

6 Claims. (Cl. 252—33)

This invention relates to a method for the concentration and improvement of an oil solution of barium petroleum sulfonates by a process of solvent fractionation. This application is a continuation-in-part of my copending application Serial No. 297,773, filed July 8, 1952, now abandoned.

During the last decade the petroleum industry has widely adopted the practice of adding detergents to lubricating oils that are used in gasoline and diesel engines. In the operation of these engines, if the fuel is not completely burned or if a film of lubricating oil on the walls of the combustion chamber is partially burned, resinous oxidation products and carbon are formed. These resins produced may build up carbon deposits in the ring belt area and produce ring plugging and ring sticking which result in high oil consumption and may eventually cause wear resulting in inefficient engine operation. The resins may also plug the oil filters. If the oil filter plugs, gritty particles of inorganic matter will not be filtered from the oil, but, instead, will circulate with the oil and lodge between close fitting metallic surfaces and cause abrasion.

The function of the detergent is to peptize the resinous contaminants, to keep them suspended in the oil in a finely divided state, and to prevent their deposition on engine parts.

Among the most widely employed detergents for the above mentioned purpose, are the alkaline earth metal petroleum sulfonates. These substances are usually prepared by the multiple batch acid treatment of lubricating oil stock distillates of low viscosity index or pressure tars utilizing concentrated or fuming sulfuric acid. The treated stock is allowed to settle forming two phases: a lower layer known as the acid sludge layer, and an upper oily layer known as the sour oil layer.

Tarry residues, resinous substances, low molecular weight water soluble sulfonic acids, known as green acids, and disulfonated acids settle out with the acid sludge layer and this sludge layer is usually disposed of as a waste product. The sour oil layer contains oil soluble sulfonates known as mahogany acids, as well as some oil insoluble sulfonates and resinous bodies dispersed in unsulfonated oils of low and high viscosity index. Upon neutralization of the sour oil layer with an excess of an aqueous alkaline earth metal hydroxide or carbonate solution, an oil solution of oil soluble detergents is formed.

At the present time it is common practice to concentrate this oil solution of alkaline earth metal sulfonate detergent to about 50% in a vacuum distillation tower for utilization as a lubricating oil detergent. Concentration is effected by distilling off some of the unsulfonated oil—predominately the high viscosity index hydrocarbon oil components. This concentrated oil solution of detergents, however, is not highly satisfactory as a lubricating oil additive, due to the presence of dispersed resinous substances, tarry matter, and oil insoluble sulfonates which are not removed by distillation. The resinous substances, tarry matter, and oil insoluble sulfonates are undesirable since they decrease the dispersing power of the detergent to some extent by absorbing a certain quantity of the latter, thus leaving less detergent available for taking of the other oil contaminants. Also, since the neutralized sour oil layer before or after vacuum distillation contains low viscosity index hydrocarbon components, it is not desirable to blend these concentrates with lube oil base stocks which possess a high viscosity index, since such blending results in a product of somewhat lower viscosity index.

It should be also mentioned here that some prior art workers have attempted to overcome the disadvantages inherent in the sulfonate detergents resulting from the vacuum distillation of neutralized sour oil by extracting the sulfonates from the neutralized sour oil with dilute alcohol solutions. Such processes involve neutralization of the sour oil with alkali metal hydroxides, rather than alkaline earth metal hydroxides, so as to facilitate the extraction of the sulfonates from the oil with dilute alcohol solutions. It has been found, however, that although such methods of extraction do effect a separation of the sulfonates from the oil, the resinous and tarry bodies are also extracted together with the sulfonates. It is therefore seen that the vacuum distillation treatment of oil solutions of oil soluble sulfonates or the dilute alcohol extraction treatment of these oil solutions fails to effect a separation of the sulfonates from the undesirable resins, tarry substances, and lower viscosity index hydrocarbon components.

It is therefore an object of this invention to start with a neutralized sour oil containing barium petroleum sulfonates, resins, tars, as well as high and low viscosity index hydrocarbon oil components, and to treat this layer in such a manner that there is produced a raffinate phase composed primarily of barium sulfonates, together with the high viscosity index hydrocarbon oil components and an extract phase composed primarily of solvent, resins, and the low viscosity index hydrocarbon oil components.

The process according to the present invention, comprises treating neutralized barium sulfonate solutions with aqueous isopropyl alcohol in specific concentrations and amounts so as to accomplish the aforementioned objects. In more detail, a sour oil layer containing mahogany acids, resinous bodies, tarry substances, together with high and low viscosity index hydrocarbon oil components, produced in any manner, is treated with a 10% excess of a saturated aqueous solution of a barium hydroxide, or carbonate, in any suitable manner to produce an oil solution containing barium sulfonates, resinous bodies, tarry substances, together with high and low viscosity index hydrocarbon oil components. This oil solution is contacted with a solvent solution comprising aqueous isopropyl alcohol to thereby produce raffinate and extract phases. The raffinate phase is composed primarily of barium sulfonates, together with the high viscosity index hydrocarbon oil components and the extract phase is composed primarily of solvent, resins, and the low viscosity index hydrocarbon oil components. The aqueous isopropyl alcohol solution should contain between about 20 and 30 per cent water and between about 2 and 3 volumes of this solution are used per volume of charge stock.

The following is given as an example illustrating a method for practicing the present invention when employing barium hydroxide to produce a concentrated barium sulfonate solution of improved purity and which possesses more desirable properties as a detergent additive for lubricating oils.

*Example*

A Mid-Continent crude, namely a Webster crude from Harris County, Texas, was fractionated in a pipestill to obtain a 40/50 distillate and a 60/80 distillate. These distillates had the following properties:

|  | 40/50 | 60/80 |
|---|---|---|
| S. S. U. Vis./100° F | 291.2 | 984 |
| S. S. U. Vis./210° F | 48.0 | 69.2 |
| V. G. C. | .859 | .863 |
| Flash O. C. (° F.) | 400 | 455 |
| Pour (° F.) | −15 | 5 |
| ASTM Distillation: |  |  |
| Initial B. P. (° F.) | 375 | 471 |
| 10 | 424 | 514 |
| 50 | 493 | 561 |
| 90 | 578 | 618 |
| End Point | 616 | 650 |

A feed stock was prepared by mixing six parts of 40/50 distillate with four parts of 60/80 distillate, and this feed stock was treated in four separate dumps with 5% by volume of fuming sulfuric acid, so that overall the feed stock was treated with 20% by volume of fuming sulfuric acid. The combined acid sludge layers amounted to about 30% by volume of the feed stock and were discarded. Each acid sludge layer contained tarry residuous, resinous substances, low molecular weight water-soluble sulphonic acids (green acids) and disulfonated acids. The sour oil layer contained oil soluble mahogany acids, oil insoluble sulfonates, and resinous bodies dispersed in unsulfonated hydrocarbon oils of low and high viscosity index. This sour oil layer was neutralized with a 10% excess of a saturated aqueous solution of barium hydroxide. After neutralization the neutralized oil was separated from the aqueous solution by decantation. The thus neutralized oil was filtered to remove inorganic salts and air-blown at approximately 170° F. to remove nearly all traces of water. The air-blown oil was then separated into two fractions. The approximate molecular weight of the sulfonates in the air-blown oil was about 1000. The first fraction was subjected to a conventional vacuum distillation treatment to produce a barium sulfonated oil concentrated solution, such as is commonly utilized as a detergent additive for automotive lubricating oils. The second fraction was treated according to the method of this invention utilizing a two stage batch extraction procedure. In more detail, one volume of the second fraction entered the first stage at 120° F. and 2.5 volumes of isopropyl alcohol solvent (containing 25 per cent water) was introduced into the second stage. The raffinate layer from the first stage was introduced into the second stage at 140° F., while the extract from the second stage was introduced into the first stage. 0.75 volumes of anhydrous isopropyl alcohol per volume of charge stock were added to the first stage as a solvent additive. The final extract phase was withdrawn from the first stage and the final raffinate phase was withdrawn from the second stage. The table below presents an analysis and comparison of (A) the neutralized and air-blown charge stock, (B) the vacuum distilled residua, and (C) the raffinate phase of the aqueous isopropyl alcohol extraction.

TABLE I

| Inspections of Sulfonate Concentrate | A Charge Stock | B Vacuum Distilled Residua | C Isopropyl Alcohol Extraction Raffinate |
|---|---|---|---|
| Wt. Percent Sulfated Ash | 4.11 | 10.30 | 8.30 |
| S. S. U. Viscosity at 210° F | 105.0 | 590.0 | 66.88 |
| Gravity API 60° F./60° F | 16.0 | 10.2 | 17.3 |
| Color ASTM Method | 5.5 D-1 | 6.75 D-1 | 5.75 D-1 |
| Viscosity Gravity Constant | .899 | 0.924 | .898 |

In Table I, the change in the weight per cent of sulfated ash shows that both the vacuum distillation and isopropyl alcohol extraction methods concentrated the sulfonates of the charge stock in the residue and raffinate respectively. The more important fact which should be noted, however, is that the vacuum distilled residua increased in viscosity while the isopropyl alcohol extraction raffinate decreased in viscosity. Since the sulfonates have a high viscosity, it would be expected that when the sulfonates were concentrated in the raffinate by isopropyl alcohol extraction, the viscosity would also increase. The fact that the viscosity of the raffinate actually decreased in comparison with the charge stock indicates that the isopropyl alcohol treatment removed the high viscosity resin components of the charge stock in the extract phase. Also, comparing the viscosity of the charge stock with the vacuum still residuum, it will be seen that the viscosity of the residuum increased more than 500 per cent. Thus, although the vacuum distillation procedure succeeded in accomplishing a concentration of the sulfonates, such procedure also unfortunately concentrated the undesirable high viscosity resin bodies with the desirable sulfonates. Table I, therefore, clearly shows that the process of this invention is capable of concentrating an oil solution of barium sulfonates and removing the high viscosity resinous bodies which are undesirable when the concentrated sulfonate solution is employed as a detergent additive in lubricating oils.

In order to show that the process of this invention also concentrates the high viscosity index hydrocarbon oil components of the charge stock with the sulfonates in the raffinate layer and removes some of the low viscosity index hydrocarbon oil components together with resin bodies in the extract solvent, several comparative tests were carried out. These tests comprised preparing a large batch of a typical lubricating oil stock of the type which is commonly employed for automotive engines and which consisted of a mixture of Pennsylvania 150 Neutral lube oil and Pennsylvania Bright Stock. This large batch of oil was then separated into three equal portions and to each of the portions was added a sufficient amount of one of the sulfonate solutions shown in Table I, so that each portion contained an equal amount of barium sulfonate (indicated by the same weight per cent sulfated ash content). Each of the blends so produced, represented a premium grade detergent oil.

The three detergent oils were as follows:

Oil AA—comprising the aforementioned lube oil base and the sulfonate solution A of Table I.
Oil BB—comprising the aforementioned lube oil base and the sulfonate solution B of Table I.
Oil CC—comprising the aforementioned oil base and the sulfonate solution C of Table I.

Inspections of detergent oils AA, BB, and CC are set forth in Table II which follows:

TABLE II

|  | Detergent Oil AA | Detergent Oil BB | Detergent Oil CC |
|---|---|---|---|
| Wt. Percent Sulfated Ash | 0.97 | 0.97 | 0.97 |
| S. S. U. Viscosity/100° F | 411.0 | 454 | 369.3 |
| S. S. U. Viscosity/200° F | 58.78 | 61.4 | 57.37 |
| Gravity °API, 60° F./60° F | 27.1 | 25.5 | 27.7 |
| Color ASTM Method | 6.25 | 7 | 6.75 |
| Viscosity Gravity Constant | 0.824 | 0.835 | 0.820 |
| Viscosity Index | 98.0 | 99.0 | 104.0 |

A study of Table II will show that, although each oil contained the same amount of barium sulfonate, the source and treatment of the sulfonate had a pronounced effect upon the viscosity index of the oil to which it was added. Thus oil AA, containing untreated sulfonates from neutralized sour oil, had a viscosity index of only 98. Oil BB, containing sulfonates from a vacuum distilled neutralized sour oil, had a very slightly improved viscosity index of 99. Oil CC, however, containing sulfonates produced according to the aqueous isopropyl alcohol extraction process of this invention, had a greatly improved viscosity index of 104. It is thus apparent that the method for concentrating sulfonates according to this invention concentrates the high viscosity index hydrocarbon oil components of the neutralized sour oil in a raffinate layer containing the sulfonates and concentrates in the extract layer the isopropyl alcohol solvent, together with the undesirable resinous bodies and low viscosity index components of the hydrocarbon oil.

It seems clear that the ability of the instant process to prepare concentrates of barium sulfonates of the character described is due to the utilization of closely controlled treating conditions. For example, it has been found that it is important to maintain such process variables as the amount and concentration of the aqueous isopropyl alcohol solution within rather close limits in order to attain the novel and highly desirable results of this invention. As stated previously, the aqueous isopropyl alcohol solution should contain between about 20 and 30 per cent water. When the concentration of water in the aqueous isopropyl alcohol solution exceeds about 30 per cent, the sulfonates will not be concentrated in the raffinate layer but, instead, will be drawn into the extract layer along with the resin bodies and a portion of the low viscosity index components of the oil. On the other hand, when the concentration of water in the aqueous isopropyl alcohol solution decreases below about 20%, no clear or definite separation or extraction is effected since the solvent is no longer selective with the result that the resin bodies, sulfonates and low viscosity index components are about equally divided between the extract and raffinate phases. The proportion of aqueous isopropyl alcohol solution to charge stock should be between 2 to 3 volumes of alcohol solution to one volume of charge stock. If the charge stock has a high viscosity the volume of solvent should be close to 3, while, if the stock is of low viscosity, the volume of the solvent should be closer to 2 volumes per volume of charge stock.

It is also necessary that the process of this invention be carried out in a multiple stage extraction unit, since single stage extraction fails to achieve the desired separation and concentration of the sulfonates in the raffinate phase. A single stage extraction unit lacks the necessary selectivity of separation. A minimum of two stages are needed to permit the solvent to accomplish the desired separation of resins, tars, disulfonates, and low viscosity index hydrocarbon oil components into the extract phase and the cencentration of alkaline earth metal sulfonates and high viscosity index hydrocarbon oil components into the raffinate phase. When utilizing two or more stages a solvent additive may be introduced into one of the stages other than the stage into which the solvent itself is being introduced in a manner well-known to those skilled in the art. It has been found preferable to utilize anhydrous isopropyl alcohol as a solvent additive. When employing anhydrous isopropyl alcohol as the solvent additive, best results have been obtained by using between .65 and .95 volume of solvent additive per volume of charge stock. It will be clear to those skilled in the art that the temperatures in the several extraction stages may vary depending upon the other variables of the process. However, in a two stage extraction unit, it has been found that a temperature of at least 100° F. in the first stage and a temperature below about 150° F. in the second stage produce satisfactory results.

This invention is not to be limited to the specific embodiments shown or the specific examples given, nor to any theories advanced as to the operation of the invention, but in the appended claims it is intended to claim all novelty inherent in the invention.

We claim:

1. A method for producing purified oil solutions of barium sulfonates which comprises neutralizing a Mid-Continent crude distillate boiling within the lubricating oil range that has been treated with concentrated sulfuric acid with a barium compound and thereafter treating the resulting oil solution of barium sulfonates, resins, and high and low viscosity index hydrocarbon oil components with an aqueous isopropyl alcohol solution containing between 20 and 30 per cent water in a multistage extraction unit, utilizing between 2 and 3 volumes of aqueous isopropyl alcohol for each volume of oil solution, and separately recovering an extract layer composed primarily of the aqueous isopropyl alcohol solution, resins, and the low viscosity index hydrocarbon oil components and a raffinate layer composed primarily of the barium sulfonates and the high viscosity index hydrocarbon oil components.

2. The method according to claim 1 wherein the aqueous isopropyl alcohol contains about 25 per cent water and about 2.5 volumes of this alcohol solution is utilized for each volume of the oil solution.

3. The method according to claim 1 wherein between about 0.65 and 0.95 volume of a solvent additive comprising isopropyl alcohol per volume of oil solution are introduced into an extraction zone other than the extraction zone into which the alcohol solution is being introduced.

4. A method for obtaining concentrated oil solutions of barium sulfonates including the steps of sulfonating a Mid-Continent crude distillate boiling within the lubricating oil range with sulfuric acid under sulfonating conditions to produce an acid sludge layer containing sludge bodies and green sulfonic acids and a sour oil layer containing high and low viscosity index hydrocarbon oil components, mahogany type sulfonic acids, and undesirable components; separating said sour oil layer and neutralizing with a barium compound to convert the mahogany type sulfonic acids to barium sulfonates, contacting the thus neutralized mixture with an aqueous isopropyl alcohol solution containing between about 20 and 30 percent water in a multi-stage extraction unit, utilizing between about 2 and 3 volumes of aqueous isopropyl alcohol for each volume of said mixture, and separately recovering an extract layer composed primarily of the aqueous isopropyl alcohol solution, undesirable components and the low viscosity index hydrocarbon oil components and a raffinate layer composed primarily of the barium sulfonates and the high viscosity index hydrocarbon oil components.

5. The method according to claim 4 wherein the aqueous isopropyl alcohol contains about 25 per cent water and about 2.5 volumes of this alcohol solution is utilized for each volume of the oil solution.

6. The method according to claim 4 wherein between about 0.65 and 0.95 volume of a solvent additive comprising isopropyl alcohol per volume of oil solution are introduced into an extraction zone other than the extraction zone into which the alcohol solution is being introduced.

References Cited in the file of this patent

UNITED STATES PATENTS

| Number | Name | Date |
| --- | --- | --- |
| 2,236,933 | Beck | Apr. 1, 1941 |
| 2,418,894 | McNab | Apr. 15, 1947 |
| 2,514,733 | Vold et al. | July 11, 1950 |
| 2,532,997 | Cohen | Dec. 5, 1950 |
| 2,684,324 | Clarke | July 20, 1954 |